United States Patent
Adams

(12) 
(10) Patent No.: US 9,126,531 B1
(45) Date of Patent: Sep. 8, 2015

(54) SAFETY MUD FLAP

(76) Inventor: Timothy Adams, Novato, CA (US)

( * ) Notice: Subject to any disclaimer, the term of this patent is extended or adjusted under 35 U.S.C. 154(b) by 220 days.

(21) Appl. No.: 13/411,226

(22) Filed: Mar. 2, 2012

Related U.S. Application Data

(60) Provisional application No. 61/448,297, filed on Mar. 2, 2011.

(51) Int. Cl.
*B60Q 1/26* (2006.01)
*F21Y 101/02* (2006.01)
*F21V 7/04* (2006.01)

(52) U.S. Cl.
CPC ... *B60Q 1/26* (2013.01); *F21V 7/04* (2013.01); *F21Y 2101/02* (2013.01)

(58) Field of Classification Search
CPC ........ B60Q 1/26; B60Q 1/302; B60Q 1/2607; B60Q 1/44; F21V 7/04; F21Y 2101/02; F21Y 2113/002; F21S 48/215
USPC ......... 362/541, 555, 800, 543, 545, 540, 509, 362/542, 487, 459
See application file for complete search history.

(56) References Cited

U.S. PATENT DOCUMENTS

| | | | | | |
|---|---|---|---|---|---|
| 5,025,351 | A | * | 6/1991 | Martin | 362/506 |
| 6,515,583 | B1 | * | 2/2003 | Lamparter et al. | 340/433 |
| 7,307,546 | B1 | * | 12/2007 | Partap | 340/907 |

\* cited by examiner

*Primary Examiner* — Anh Mai
*Assistant Examiner* — Jessica M Apenteng
(74) *Attorney, Agent, or Firm* — Larry D. Johnson

(57) ABSTRACT

A safety mud flap for trucks or other vehicles includes a plurality of integral lights. A first set of lights is configured as a series of sequentially sized outlines of directional arrows, preferably yellow or amber in color, and is activated as a turn signal (e.g., with the arrow outlines going from smaller to larger), or as hazard lights. A second set of lights is in the form of a larger outline of a directional arrow configured around the first set of arrows, is preferably white in color, and is illuminated only when the vehicle is backing up. An audible backup beeper or alarm is preferably co-located within the series of arrows, and is also activated when backing up. A third set of lights is configured as a running light/brake light in the form of a separate red circle or oval preferably located near the bottom of the mud flap. Each set of lights is connected to the corresponding circuit in the vehicle's wiring system.

5 Claims, 1 Drawing Sheet

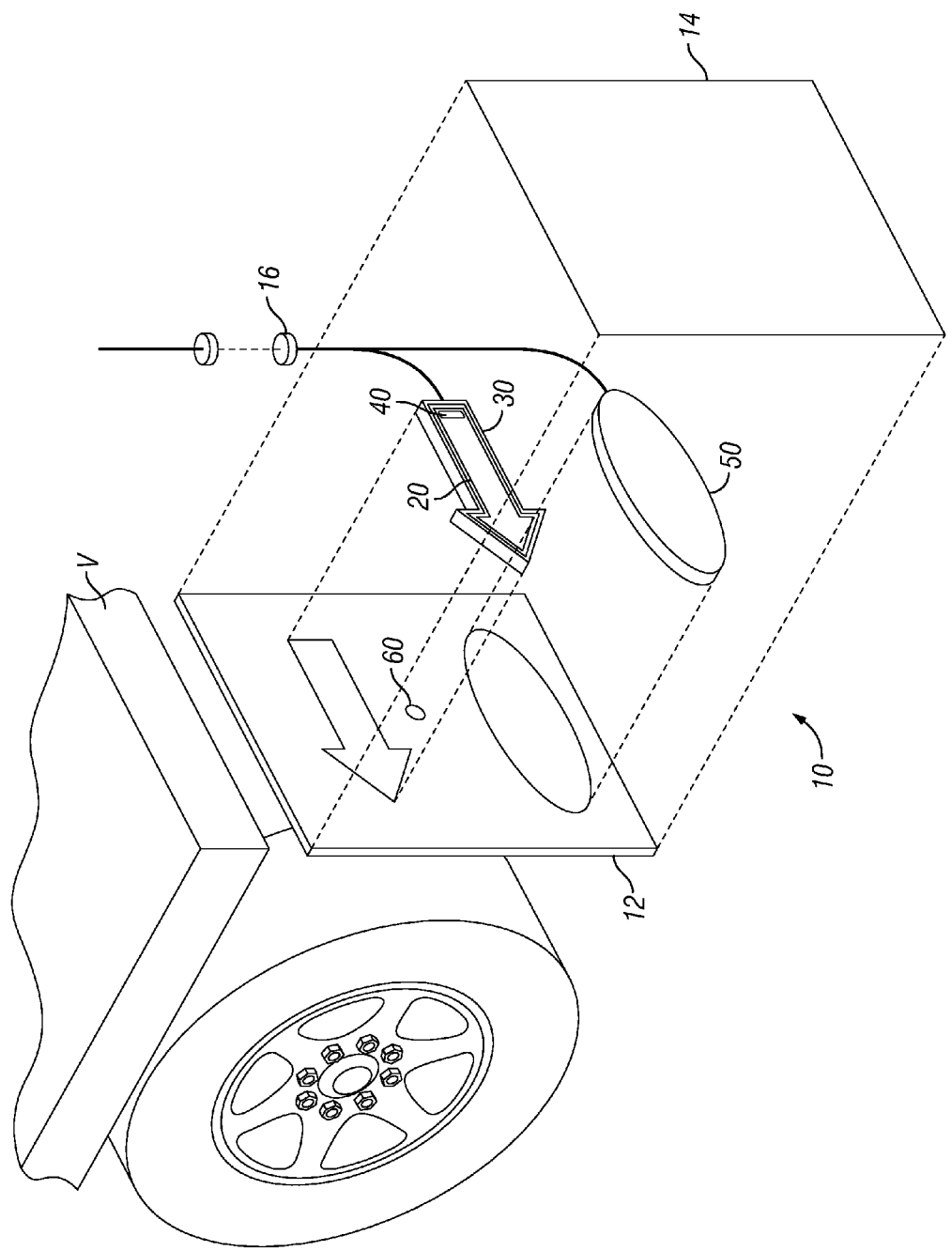

SAFETY MUD FLAP

CROSS REFERENCE TO RELATED APPLICATIONS

The present application claims the benefit of the filing date of U.S. Provisional Patent Application Ser. No. 61/448,297, filed Mar. 2, 2011. The foregoing application is incorporated by reference in its entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to truck parts and accessories, and more particularly to an improved mud flap apparatus for trucks.

BACKGROUND INFORMATION AND DISCUSSION OF RELATED ART

Mud flaps for trucks and other vehicles are intended to keep mud, rocks, and other debris from flying up at the vehicle driving behind them. However, typical mud flaps do nothing to increase the visibility of the truck. For example, when driving at night it is difficult to see the tail lights on a truck or trailer, particularly in the rain or fog. Many accidents occur by hitting the back of a truck or trailer, just because it was not seen in time to stop. Furthermore, when a truck is working on a highway project, which is mostly done at night when traffic is low, it is difficult for the truck operator to see what hazards are behind him.

U.S. Pat. No. 4,413,839 to McCain discloses a mud flap stabilizer device for use with an elongate, generally rectangular mud flap formed of flexible material and swingably supported adjacent its upper end from a vehicle body rearwardly of and in close proximity to a vehicle wheel mounted tire. The stabilizer device includes a frame body with a hanger member extending upwardly therefrom and connected to a normally horizontally extending bar member in a depending relationship. The bar member is swingably mounted to the vehicle body rearwardly of the mud flap whereby the frame body is positioned against the mud flap. Rotation limiting arms control swinging movement of the frame body to limit movement of the mud flap. Illumination members such as reflectors or electrical lamps are connected to the frame body for visual enhancement.

U.S. Pat. No. 5,032,955 to Jurgens describes a lighting system for over-the-road tractor-trailers or other large vehicles which includes a plurality of lamps, mounted on a rear mud flap and directed downward and to the side, so as to cast a light pattern in an illuminated region on the road surface which is visible to the driver. Each lamp is mounted within a parabolic reflector and has a louver bolted on the bottom of the light to direct the light along a selected axis so as to effectively position the pattern at the most desirable location to allow the driver to see and control the rear of the truck. The driver is able to determine where the rear of the vehicle is by glancing at his side-mounted rear-view mirror and seeing the light pattern on the road surface. This facilitates maneuvering of the truck in tight spaces and in passing on the highway.

U.S. Pat. No. 6,164,804 to Self teaches a truck light bar and mudflap holder apparatus includes a beam-to-body resilient connection assembly for connection to a portion of a truck body. A support beam is connected to the beam-to-body resilient connection assembly, and light modules are supported by the support beam. A mudflap assembly is supported by the support beam. The resilient nature of the beam-to-body resilient connection assembly permits the truck light bar and mudflap holder apparatus of the invention to yield to outside forces without being broken or damaged. When the outside forces are removed, the truck light bar and mudflap holder apparatus returns to the original position. With one embodiment of the invention, the beam-to-body resilient connection assembly includes an attachment bracket connected to the truck body, and a rotation hinge is connected to the attachment bracket. A spiral beam bias spring is connected between the support beam and the attachment bracket.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The safety mud flap of the present invention provides a mud flap for a truck or other vehicle, with a plurality of integral lights. A first set of lights is configured as a series of sequentially sized outlines of directional arrows, preferably yellow or amber in color, and is activated as a turn signal (e.g., with the arrow outlines going from smaller to larger), or as hazard lights. A second set of lights is in the form of a larger outline of a directional arrow configured around the first set of arrows, is preferably white in color, and is illuminated only when the vehicle is backing up. An audible backup beeper or alarm is preferably co-located within the series of arrows, and is also activated when the vehicle is backing up. A third set of lights is configured as a running light/brake light in the form of a separate red circle or oval preferably located near the bottom of the mud flap. Each set of lights is connected to the corresponding circuit in the vehicle's wiring system, as by a quick disconnect plug.

All of these lights are preferably constructed as LEDs and associated circuitry sealed within the mud flap behind a durable lens of polycarbonate, acrylic, or other suitable material. The LEDs could be colored (e.g., yellow or amber for the turn/hazard lights, white for the backup lights, and red for the running/brake lights, respectively) with clear lenses, or white LEDs could be used throughout with the use of appropriately colored or clear lenses. For example, the stop lens may be red in color, with red LEDs for the running lights, and white LEDs for the brake lights, so that the running lights display a relatively dimmer red light when illuminated, but when the brakes are applied, a significantly brighter red light is displayed.

It is therefore an object of the present invention to provide a new and improved safety mud flap for trucks and other vehicles.

It is another object of the present invention to provide a new and improved mud flap with integral warning lights.

A further object or feature of the present invention is a new and improved mud flap with a backup light and associated audible alarm.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a plan view of a safety mud flap of this invention.

DETAILED DESCRIPTION OF THE INVENTION

Referring to FIG. 1, there is illustrated therein a new and improved safety mud flap for trucks and other vehicles V, generally denominated 10 herein, with a plurality of integral lights encased between backing 12 and lens 14. Each set of lights is connected to the corresponding circuit in the vehicle's wiring system by quick disconnect plug 16. A first set of lights 20 is configured as a series of sequentially sized outlines of directional arrows, preferably yellow or amber in color, and is activated as a turn signal (e.g., with the arrow outlines sequentially going from smaller to larger), or as hazard lights. A second set of lights 30 is in the form of a larger outline of a directional arrow configured around the first set of arrows, is preferably white in color, and is illuminated only when the vehicle is backing up. An audible backup beeper or alarm 40 is preferably co-located within the series of arrows, and is also activated when the vehicle is backing up. A third set of lights 50 is configured as a running light/brake light in the form of a separate red circle or oval preferably located near the bottom of the mud flap.

Use of the inventive safety mud flaps provides many benefits. For example, as the vehicle backs up, the operator can see the area around the tires where the point of impact would be from the cab of the truck, thus making it safer. When driving down the road, the running/stop lights integrated into the mud flaps at eye level can be seen easily by the vehicle behind, and when the brake is applied, the brake light at eye level is illuminated.

The preferred integral construction encases the lights and protects them from water, dust, and mud. The back of the mud flap has rubber glued, vulcanized, or otherwise adhered behind all the lens components, arrows and running and brake lights resulting in a sealed beam safety mud flap.

Applications include the auto industry, motorcycles, and commercial trucking industry, as well as heavy equipment. The invention can also be used as a safety feature while equipment is running, such as on tree shredders when blades are turning the flaps could be programmed to be flashing "danger." This feature may improve safety for all and may save lives.

One or more of the various light sets on the inventive mud flaps can be optionally configured as a word, symbol, logo, or other indicia. For example, the red running/brake light could be configured to display the word "STOP", "DANGER", or other word, or be configured as a red hand in a "stop" gesture, a conventional stop sign, or other shape. Alternatively, one or more of the light sets could be in the form of a company name or logo (e.g., "Budweiser", the John Deere "deer" logo, etc.). Optionally, the letters, words, or other images could be displayed on imaging screens or monitors, instead of LEDs, and safely encased in polycarbonate as above.

The mud flaps may also include a backup camera 60, preferably in the form of a fisheye lens, installed as above.

The incorporated lighting feature can also be used with floor mats, such as when driving at night having subdued lights at the operator's feet, making this safer while driving. The lighting can also be used as a floor mat around milling machines, overhead cranes, and other applications (e.g., flashing "do not enter, crane is in use"). Residential or commercial floor mats could have a pressure sensitive switch and illuminate when you step on them, helping you to find your keys, etc. The floor mats could also be battery powered, so no external power cord is necessary.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A safety mud flap for a vehicle comprising:
a mud flap including a first set of lights configured as a series of sequentially sized outlines of directional arrows activated as a turn signal, a second set of lights in the form of a larger outline of a directional arrow configured around said first set of lights, illuminated only when the vehicle is backing up, and a third set of lights configured as a running light/brake light separate from said first and second sets of lights, wherein said first, second, and third sets of lights are encased in said mud flap with a rubber backing behind said first, second, and third sets of lights.

2. The safety mud flap of claim 1 further including an audible backup alarm activated only when the vehicle is backing up.

3. The safety mud flap of claim 2 wherein said backup alarm is co-located within said second set of lights.

4. The safety mud flap of claim 1 wherein said lights are constructed as LEDs and associated circuitry sealed within said mud flap behind a durable lens.

5. The safety mud flap of claim 1 wherein said lights are colored LEDs with clear lenses.

* * * * *